Sept. 5, 1972 GORO AKASHI ET AL 3,689,317
MAGNETIC RECORDING MEDIUM
Original Filed Feb. 12, 1969
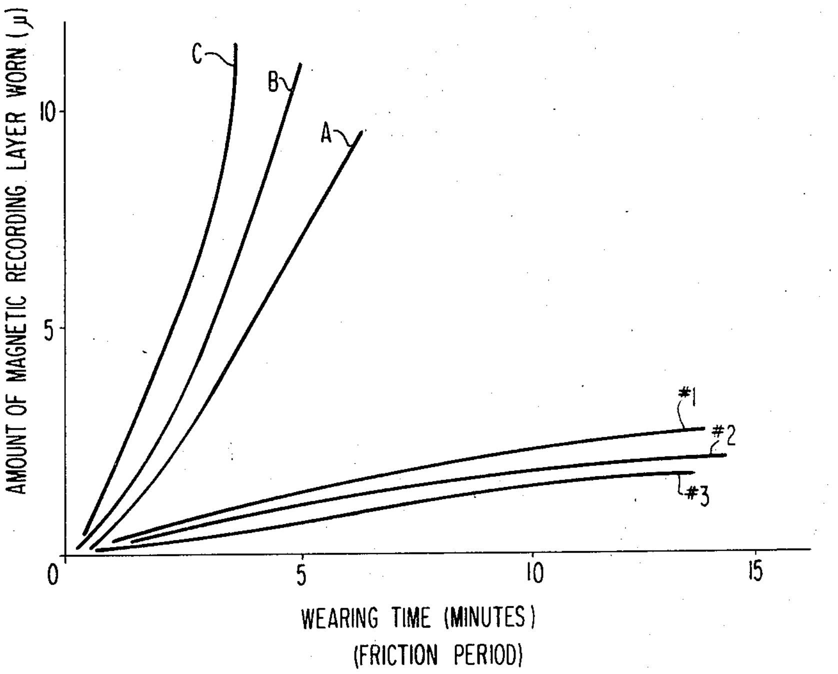
INVENTORS
GORO AKASHI
YASUYUKI YAMADA
BY Sughrue, Rothwell, Mion, Zinn & Macpeak
ATTORNEYS United States Patent Office 3,689,317

Patented Sept. 5, 1972

3,689,317

MAGNETIC RECORDING MEDIUM

Goro Akashi and Yasuyuki Yamada, Odawara, Japan, assignors to Fuji Photo Film Co., Ltd., Kanagawa, Japan Continuation of abandoned application Ser. No. 798,643, Feb. 12, 1969. This application June 7, 1971, Ser. No. 150,744

Claims priority, application Japan, Feb. 12, 1968, 43/8,706

Int. Cl. H01f *10/02*

U.S. Cl. 117—240 9 Claims

ABSTRACT OF THE DISCLOSURE

Magnetic recording medium wherein magnetizable layer comprises magnetizable particles dispersed in a binder formed of a cellulose resin, and epoxy resin and a polyisocyanate.

CROSS-REFERENCE TO RELATED APPLICATION

This application is a continuation of Ser. No. 798,643, filed Feb. 12, 1969, now abandoned.

BACKGROUND OF THE INVENTION

Field of the invention

This invention relates to a magnetic recording medium and, more particularly, it is concerned with a composition of a binder in which magnetizable particles are dispersed to produce a magnetic recording medium excellent in surface smoothness, wear resistance and traveling durability, preferably used as a video tape or a magnetic recording tape in a computer.

Description of the prior art

In commonly used magnetic recording media such as audio tape and video tape, magnetizable particles are coated onto a film support of a synthetic resin (such as polyethylene terephthalate, cellulose diacetate, cellulose triacetate or polyvinyl chloride) in a binder, such as a vinyl chloride-vinyl acetate (as Vinylite Resin manufactured by The Union Carbide Corporation), polybutyl acrylate or polymethyl methacrylate. However, these binders have several disadvantages since they are composed mainly of a thermoplastic resin. That is to say, these binders are dissolved easily in organic solvents such as esters and ketones, are markedly attacked by aromatic hydrocarbons, do not have a durability sufficient for use as such media, considering their temperature and humidity dependence. This is due to the fact that none of the ingredients has a three-dimensional network as its chemical structure. In a video tape or a tape for use in an electronic computer, in particular, wearing and stripping of a magnetic recording layer of such a medium often occurs and "drop-out" due to dust is caused, resulting in serious malfunctioning. Moreover, the solvent resistance thereof is inferior, and unfavorable phenomena tend to occur due to changes in temperature and humidity.

SUMMARY OF THE INVENTION

We the inventors have made efforts to solve the above problems of the known magnetic recording media and have found that a composition comprising a cellulose resin, an epoxy resin and a polyisocyanate can favorably be used as the foregoing binder.

It is the principal object of the invention to provide a magnetic recording medium having excellent durability and surface smoothness.

BRIEF DESCRIPTION OF THE DRAWING

The drawing is a graph wherein the horizontal coordinate represents wearing time (in minutes) and the vertical coordinate represents the quantity of the magnetizable layer which is worn. The graph illustrates a comparison between the layer of the present invention and the prior art magnetizable layers.

DESCRIPTION OF THE PREFERRED EMBODIMENTS

More specifically, this invention provides a magnetic recording medium comprising a support and a magnetizable layer provided thereon composed of magnetizable particles dispersed in a binder, wherein said binder is composed of cellulose resin having 7.5 to 40% unsubstituted hydroxy groups, an epoxy resin and a polyisocyanate.

A representative process for obtaining the magnetic recording medium of the invention consists in dispersing magnetizable particles in a solution of said cellulose resin and said epoxy resin (dissolved in a solvent), adding polyisocyanate directly thereto, before coating, to prepare a coating solution, coating the coating solution onto a support such as plastic film, metal sheet or metal foil, and then drying. Of course, the present invention is not intended to be limited thereby, and the foregoing mixing procedure or order thereof may be optionally varied.

The cellulose resin used in the invention is one wherein 7.5–40% of the —OH groups remain. This percentage means that 60–92.5% of all the —OH groups of the cellulose having the basic structure of the cellulose resin are modified with some groups. Within this range, the softening point is sufficiently high and the dispersibility of magnetizable particles therein is so excellent that the surface of a magnetizable layer formed can be very smooth. Illustrative of modified or esterified cellulose having the foregoing basic structure are cellulose nitrate, cellulose acetate, ethyl cellulose, cellulose acetate butyrate and cellulose propionate. The degree of esterification corresponds to 60–92.5%.

The epoxy resin used in the invention can be made by condensation of epichlorohydrin with bisphenol A, a condensation product obtained by reacting a polyhydric phenol, such as bisphenol A, with ethylene oxide or propylene oxide in the presence of an alkaline or acidic catalyst, a dibasic acid obtained by dimerizing an unsaturated fatty acid such as linolenic acid, a polyalkylene glycol such as polyethylene glycol or polypropylene glycol, novolac resin, bisphenol F, tetrachlorobisphenol A, diphenol acid, butadiene, bisphenol S, bisphenol V and peracetic acid. These epoxy resins are commercially sold as articles bearing trademarks such as "Epikote" (Shell Chemical Co.), "Araldite" (Ciba Ltd.), "DER" (Dow Chemical) "ERL" (UCC Plastics Co.), and "ADK Ep" (Asahi Denka Co., Japan). The weight per epoxy equivalent required for such epoxy resins is preferably within the range of 130–330. When the weight per epoxy equivalent is more than 330, the epoxy resin is solid at normal temperature, being often hardly soluble in solvents, and does not give a coating of sufficient softness, though it dissolves in a solvent. When the equivalent is less than 130, the durability of a coating deteriorates because of the molecular weight which is too small.

As the polyisocyanate, a wide variety can be used, for example, an aliphatic diisocyanate, an aliphatic diisocyanate having a cyclic group, an aromatic diisocyanate, naphthalene isocyanate, biphenyl isocyanate, di- or triphenylmethane diisocyanate, triisocyanate or tetraisocyanate, etc. Typical of commercially manufactured isocyanates which can be used are tolylene diisocyanate, 3,3'-bitolylene diisocyanate, diphenylmethane-4,4'-diisocyanate, 3,3' - dimethyldiphenylmethane-4,4'-diisocyanate, a dimer of 2,4-tolylene diisocyanate, methaphenylene diisocyanate, triphenylmethane-4,4',4''-triisocyanate and hexamethylene diisocyanate.

The cellulose resin and epoxy resin ingredients of the binder of the invention have an important quantity relation. Specifically, as the proportion of the cellulose resin is increased, the dispersibility of magnetizable particles is raised, while the durability, such as heat resistance and solvent resistance, deteriorates. As the proportion of the epoxy resin is increased, the durability is raised, whereas the dispersibility of magnetizable particles lowers, resulting in an insufficient orientation of the particles under a magnetic field. It is apparent from the foregoing relationship that the compounding ratio of the cellulose resin and epoxy resin must be within the range of 2:8–7:3. It is desirable to determine the addition proportion of the polyisocyanate according to a relation with the quantity of the epoxy resin.

Since the feature of this invention lies in, in particular, the composition of the binder, any material known in the art may be used for the magnetizable particles, for example $\gamma$-$Fe_2O_3$, $Fe_3O_4$, Co-containing $\gamma$-$Fe_2O_3$, Co-containing $Fe_3O_4$, $Zn_xFe_{(1-x)}Fe_2O_4$, $CrO_2$, Sb- or Te containing $CrO_2$ and Fe-Co-Ni, Fe-Co-Cu and Co-Ni alloy in powdered form. The size of the particles is generally about less than 2 microns. The smaller the particle size, the higher the characteristics of the magnetic recording medium obtained.

The following examples, in which all references to proportions are to be taken as references to proportions by weight, are given in order to illustrate the invention in detail without limiting the same.

Example 1

| | Parts |
|---|---|
| Magnetizable powder: $\gamma$-$Fe_2O_3$ | 300 |
| Cellulose resin: nitrocellulose having 30% of residual —OH groups | 30 |
| Epoxy resin: "EPIKOTE 815" (trade name; weight per epoxy equivalent: 150–170; manufactured by Shell Chemical Corporation, USA) | 30 |
| Graphite powder | 19 |
| Non-ionic active surfactant: "IONET K" (trade name; manufactured by Sanyo Chemical Industries Ltd., Japan | 15 |
| Fluorine-containing resin oil (low polymerized oily material having a repeated unit of —($CF_2 \cdot CFCl$—) | 1.5 |
| Lecithin | 4 |
| Butyl acetate | 550 |

The ingredients of the foregoing composition were charged to a ball mill and mixed adequately to disperse the magnetizable particles. 8 parts of 2,4-tolylene diisocyanate was then added thereto and dispersed, and the resulting coating solution was applied to a polyethylene terephthalate film of 25 microns thickness to give a coating thickness of 10 microns on the dry base. The thus resulting wide coated film was subjected to the radiation of infrared rays to thus cure the epoxy resin and the polyisocyanate, to a supercalender for the purpose of surface glazing the magnetizable layer, and then slit to a width of 2 inches to provide a video tape, Sample 1.

Example 2

| | Parts |
|---|---|
| Magnetizable powder: Fe-Co-Ni alloy powder (60:35.5 by weight) | 300 |
| Cellulose resin: cellulose acetate butyrate having 28% of residual —OH groups | 25 |
| Epoxy resin: "EPIKOTE 834" (trade name; weight per epoxy equivalent: 225–290, manufactured by Shell Chemical Corporation, USA) | 25 |
| Lecithin | 2 |
| Non-ionic active surfactant (aforementioned) | 15 |
| Fluorine-containing resin (aforementioned) | 1.2 |
| Methyl isobutyl ketone | 245 |
| Toluene | 245 |

The ingredients of the foregoing composition were dispersed uniformly in a ball mill, mixed uniformly with "Desmodur L-75" (trade name; polyisocyanate manufactured by Bayer, A.G., Germany) and the resulting coating solution was applied to a polyethylene terephthalate film of 25 microns thickness to give a coating thickness of 12 microns on a dry base. The thus resulting coated film was held at 90° C. for 12 hours to thus cure the epoxy resin and the polyisocyanate, subjected to a glazing treatment for the formed magnetizable layer and slit to a width of ½ inch to provide a magnetic recording tape for a computer, Sample 2.

Example 3

| | Parts |
|---|---|
| Magnetizable powder: $Fe_3O_4$ | 300 |
| Cellulose resin: cellulose acetate butyrate having 15% of residual —OH groups | 50 |
| Epoxy resin "EPIKOTE 815" (aforementioned) | 30 |
| Carbon black | 19 |
| Non-ionic active surfactant (aforementioned) | 15 |
| Lecithin | 3 |
| Silicone oil | 1 |
| Fluorine-containing resin oil (aforementioned) | 1.5 |
| Methyl isobutyl ketone | 275 |
| Toluene | 275 |

The ingredients of the foregoing composition were treated as in Example 1 with 8 parts of a mixture of 2,4- and 2,6-tolylene diisocyanate (mixing ratio 65:35 and 10 parts of polyoxypropylene glycol (average molecular weight 1,000) then being added and uniformly dispersed therein. The resulting coating solution was coated onto a polyethylene terephthalate film of 25 microns thickness to give a coating thickness of 3 microns and dried. The resulting coated film was subjected to a surface glazing treatment for the formed magnetizable layer as in the foregoing examples, and slit in a width of ¼ inch to provide a tape for a low speed cassette, Sample 3.

The following comparative examples of known tapes are given for a comparison of the characteristics of the magnetic recording tapes obtained in the foregoing examples (the tapes of the invention) with those of the prior art.

Comparative Example A

| | Parts |
|---|---|
| Magnetizable particles: $\gamma$-$Fe_2O_3$ | 300 |
| Vinyl chloride-vinyl acetate copolymer, "Vinylite VYHH" (trade name; manufactured by Union Carbide Corporation, USA) | 125 |
| Dibutyl phthalate | 15 |
| Castor oil | 8 |
| Antistatic agent, "Sanstat 1007" (trade name; manufactured by Sanyo Chemical Industries Ltd.) | 10 |
| Lecithin | 5 |
| Butyl acetate | 450 |
| Toluene | 150 |

Using the ingredients of the foregoing composition, a magnetic recording tape, Sample A was prepared following the basic procedures of the foregoing examples.

Comparative Example B

| | Parts |
|---|---|
| Magnetizable particles: $\gamma$-$Fe_2O_3$ | 300 |
| Nitrocellulose "RS ½" (trade name; manufactured by Daicel Ltd.) | 70 |
| Dibutyl phthalate | 20 |
| Anionic active surfactant, "Sanstat No. 6" (trade name; manufactured by Sanyo Chemical Industries Ltd.) | 10 |
| Lecithin | 8 |
| Fluorine-containing resin oil (aforementioned) | 5 |
| Butyl acetate | 450 |
| Toluene | 150 |

Using the ingredients of the foregoing composition, Sample B was prepared as in the foregoing examples:

Comparative Example C

| | Parts |
|---|---|
| Magnetizable particles: $\gamma$-$Fe_2O_3$ | 300 |
| Polyvinyl acetate, "S-nyl" (trade name; manufactured by Sekisui Chemical Co., Ltd.) | 120 |
| Lecithin | 5 |
| Antistatic agent, "Sanstat 1007" (trade name; manufactured by Sanyo Chemical Industries, Ltd.) | 10 |
| Fluorine-containing resin oil (aforementioned) | 6 |
| Butyl acetate | 450 |
| Toluene | 150 |

Using the ingredients of the foregoing composition, Sample C was prepared in the similar manner to those of the foregoing examples.

The drawing is a graph comparing the wear resistances of the magnetic recording media prepared in the foregoing examples and those of the Comparative Examples, in which the horizontal coordinate represents the wearing time (unit:minutes) and the vertical coordinate represents the quantity worn of the sample tape (unit:$\mu$). Each curve of the graph representative of the measured values is marked with the tested sample number.

As is evident from the drawing about 10–20 minutes or more are required to wear the magnetic recording tapes of the invention by a quantity corresponding to that wherein the magnetic recording tapes of the Comparative Examples are worn at a wearing time of 1–2 minutes. That is to say, in accordance with this invention, the smoothness and wear resistance of a magnetic layer of a magnetic recording tape are improved at least ten times over those of the prior art. It will readily be understood that this shows a ratio of durability of magnetic recording tapes so that it is clear that the practical meaning of the invention is very important. The magnetic recording tape of the invention has excellent features with respect to wear resistance and surface smoothness over the prior art using ordinary binders.

To further amplify upon the present invention, the polyisocyanate utilized is most preferably present in an amount of from 30–80% by weight, based on the amount of epoxy resin. It has been found that most preferable results are obtained when the cellulose resin utilized illustrates a degree of polymerization within the range 1,000–4,000.

As indicated, the epoxy and the polyisocyanate resin do cross-link with each other. For instance, this may be done by heating the unit to a temperature of about 90° C. or greater. It is felt that once the exact materials are disclosed, and the compounding ratio thereof cited, the exact cross-linking procedure utilized will be obvious in view of the heretofore offered portions of the specification.

To further define Example 2, 17 parts by weight polyisocyanate were utilized therein. The amount of magnetizable particles in the binder of the present invention is essentially non-critical to this invention. Generally, amounts of magnetizable particles utilized by the prior art standard tapes are acceptable. For instance, the following composition is an average, but by no means limiting, composition: 300 magnetizable particles, 70–150 binder, 600–800 solvent.

As for the thickness of the binder or magnetizable layer of the present invention, thicknesses utilized in the prior art are perfectly acceptable for the present invention, no true criticality being attached to this feature. In general, it has been found that the thinner the magnetizable layer, the better the results obtained are.

A number of subsidiary materials are utilized in forming the magnetizable layer of the present invention, and these are set out in the examples. These materials are not essential to the present invention, but merely yield most preferred results in the compounding steps. For instance, lecithin is used as a dispersing agent for the magnetizable particles. Carbon black serves to improve surface conductivity and reduce noise. Castor oil serves as a softening agent, the silicone oil serves as a defoaming agent, and the fluorinated oil improves heat resistance and the lubricating effects of the binder.

We claim:

1. A magnetic recording medium having excellent durability, wear resistance and surface smoothness comprising a support and a magnetizable layer provided thereon, said magnetizable layer comprising magnetizable particles dispersed in a binder which consists essentially of a cellulose resin having from about 7.5 to about 40% unsubstituted hydroxy groups, an epoxy resin and from 30 to 80% by weight, based on the weight of said epoxy resin, of a polyisocyanate, wherein the weight ratio of said cellulose resin to said epoxy resin varies from 2:8 to 7:3, and wherein said polyisocyanate is cross-linked with said epoxy resin.

2. A magnetic recording medium according to claim 1 wherein said magnetizable particles are members selected from the group consisting of $\gamma$-$Fe_2O_3$, $Fe_3O_4$, Co-containing $\gamma$-$Fe_2O_3$, Co-containing $Fe_3O_4$, $Zn_xFe_{(1-x)}Fe_2O_4$, $CrO_2$, Fe-Co-Ni alloy, Fe-Co-Cu alloy and Co-Ni alloy.

3. A magnetic recording medium according to claim 1 wherein said cellulose resin is a member selected from the group consisting of cellulose nitrate, cellulose acetate, ethyl cellulose, cellulose acetate butyrate and cellulose propionate.

4. A magnetic recording medium according to claim 1 wherein said epoxy resin is a condensation product of epichlorohydrin with a member selected from the group consisting of bisphenol A, a condensation product obtained by reacting a polyhydric phenol with a member selected from the group consisting of ethylene oxide and propylene oxide in the presence of a catalyst, a dibasic acid obtained by dimerizing an unsaturated fatty acid, a polyalkylene glycol, a novolac resin, bisphenol F, tetrachlorobisphenol A, diphenolic acid, butadiene, bisphenol S, bisphenol V and peracetic acid.

5. A magnetic recording medium according to claim 4 wherein said polyalkylene glycol is selected from the group consisting of polyethylene glycol and polypropylene glycol.

6. A magnetic recording medium according to claim 1 wherein said polyisocyanate is a member selected from the group consisting of tolylene diisocyanate, 3,3′-bitolylene diisocyanate, diphenylmethane-4,4′-diisocyanate, 3,3′-dimethyldiphenylmethane-4,4′-diisocyanate, a dimer of 2,4-tolylene diisocyanate, methaphenylene diisocyanate, triphenylmethane-4,4′,4″-triisocyanate, and hexamethylene diisocyanate.

7. A magnetic recording medium as in claim 1 wherein said cellulose resin has a degree of polymerization of from 1000 to 4000.

8. A magnetic recording medium according to claim 4 wherein the weight per epoxy equivalent for said epoxy resin varies from 130 to 330.

9. A magnetic recording medium as in claim 2 wherein the particle size of said magnetizable particles is less than 2 microns.

References Cited

UNITED STATES PATENTS

| | | | |
|---|---|---|---|
| 3,357,855 | 12/1967 | Bisschops et al. | 117—138.8 |
| 3,475,356 | 10/1969 | Davis et al. | 260—13 |
| 3,216,846 | 11/1965 | Hendricx et al. | 117—62 |
| 3,397,178 | 8/1968 | Shackeiford et al. | 260—47 |
| 3,472,798 | 10/1969 | Pitchforth et al. | 260—2.5 |

FOREIGN PATENTS

| | | | |
|---|---|---|---|
| 756,038 | 3/1967 | Canada | 117—235 |
| 836,202 | 6/1960 | Great Britain. | |
| 982,665 | 2/1965 | Great Britain | 117—235 |

WILLIAM D. MARTIN, Primary Examiner

B. D. PIANALTO, Assistant Examiner

U.S. Cl. X.R.

117—161 KP, 235; 252—62.54; 260—13, 837 PV, 858